(12) United States Patent
Inao et al.

(10) Patent No.: US 9,358,938 B2
(45) Date of Patent: Jun. 7, 2016

(54) CLAMP STRUCTURE OF HARNESS PROTECTION TUBE

(71) Applicant: Yazaki Corporation, Tokyo (JP)

(72) Inventors: Shinichi Inao, Makinohara (JP); Hideomi Adachi, Makinohara (JP); Takeshi Ogue, Makinohara (JP); Tatsuya Oga, Makinohara (JP); Masaaki Suguro, Makinohara (JP); Yoshiaki Ozaki, Makinohara (JP); Hiroyuki Yoshida, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/418,585

(22) PCT Filed: Aug. 30, 2013

(86) PCT No.: PCT/JP2013/073444
§ 371 (c)(1),
(2) Date: Jan. 30, 2015

(87) PCT Pub. No.: WO2014/034904
PCT Pub. Date: Mar. 6, 2014

(65) Prior Publication Data
US 2015/0151693 A1    Jun. 4, 2015

(30) Foreign Application Priority Data
Sep. 3, 2012    (JP) .................. 2012-192881

(51) Int. Cl.
*F16L 3/08* (2006.01)
*B60R 16/02* (2006.01)
*H02G 3/32* (2006.01)
*H02G 3/40* (2006.01)

(52) U.S. Cl.
CPC ............. *B60R 16/0215* (2013.01); *H02G 3/32* (2013.01); *H02G 3/40* (2013.01)

(58) Field of Classification Search
CPC .......... B60R 16/0215; F16L 3/10; F16L 2/10; F16L 3/1033; F16L 3/1041; F16L 3/1075; F16L 55/02; F16L 3/06; F16L 3/04; G06F 2217/36
See application file for complete search history.

(56) References Cited

U.S. PATENT DOCUMENTS

| | | | |
|---|---|---|---|
| 9,080,698 B2 * | 7/2015 | Fukumoto | F16L 3/2235 |
| 2007/0007029 A1 * | 1/2007 | Suzuki | H02G 3/30 174/68.1 |

(Continued)

FOREIGN PATENT DOCUMENTS

| | | |
|---|---|---|
| FR | 2963909 A1 | 2/2012 |
| JP | 3-18612 U | 2/1991 |

(Continued)

OTHER PUBLICATIONS

Communication, Issued by the International Searching Authority, Dated Sep. 24, 2013, in counterpart International Application No. PCT/JP2013/073444.

(Continued)

*Primary Examiner* — Christopher E Garft
(74) *Attorney, Agent, or Firm* — Sughrue Mion, PLLC

(57) ABSTRACT

A harness pressing part (6) which is inserted into a harness protection tube (1) from a hole part (3) formed in a peripheral wall (2) of the harness protection tube (1) comes into pressure contact with a harness (9) thereby to depress fluttering of the harness (9).

3 Claims, 6 Drawing Sheets

(56) References Cited

U.S. PATENT DOCUMENTS

| | | |
|---|---|---|
| 2007/0278358 A1 | 12/2007 | Clark |
| 2011/0067920 A1 | 3/2011 | Toyama et al. |
| 2013/0008711 A1 | 1/2013 | Toyama et al. |
| 2013/0009019 A1* | 1/2013 | Fukumoto ............. F16L 3/2235 248/67.5 |
| 2014/0151514 A1* | 6/2014 | Asai ................... B60R 16/0215 248/74.1 |

FOREIGN PATENT DOCUMENTS

| | | |
|---|---|---|
| JP | 2001-221373 A | 8/2001 |
| JP | 2011-72079 A | 4/2011 |
| JP | 2011-193677 A | 9/2011 |

OTHER PUBLICATIONS

Search Report dated Sep. 24, 2013 issued in International Application No. PCT/JP2013/073444 (PCT/ISA/210).

Written Opinion dated Sep. 24, 2013 issued in International Application No. PCT/JP2013/073444 (PCT/ISA/237).

Search Report dated Feb. 10, 2016, issued by the European Patent Office in counterpart European Application No. 13832199.7.

Office Action dated Jan. 21, 2016, issued by the Japanese Patent Office in counterpart Japanese Application No. 2012-192881.

* cited by examiner

CLAMP STRUCTURE OF HARNESS PROTECTION TUBE

TECHNICAL FIELD

The present invention relates to a clamp structure of a harness protection tube through which a harness is passed, which is provided for the purpose of preventing fluttering of the harness due to a gap between the harness and the harness protection tube, in a state where the harness protection tube is fixed to a mounting side of a vehicle body or the like by means of a clamp.

BACKGROUND ART

It has been conventionally known that a wire harness which is arranged in an automobile is fixed to a vehicle body or the like by means of a clamp. In Patent Document 1, it is described that in a hybrid car 51 or the like, in which a wire harness 58 is arranged from an inverter 55 continued from a motor 54 at a front side of the vehicle to a high voltage battery 56 at a rear side of the vehicle, and a part of the wire harness 58 is exposed under a floor 52 of the hybrid car 51, as shown in FIG. 6, the wire harness 58 is fixed to a vehicle body 53 by means of a clamp 59. Denoted with numeral 63 is a reinforce member for reinforcement.

The wire harness 58 includes at least a protection member (that is, a harness protection tube) 60 having a round or elliptical shape in cross section, for example, two high voltage electric wires 61 having a positive terminal and a negative terminal which are passed through the protection member 60, and a low voltage electric wire which is not shown. The high voltage electric wires 61 are connected to the high voltage battery 56, and the low voltage electric wire is electrically connected to a low voltage battery 62 which is positioned adjacent to the high voltage battery 56.

The protection member 60 is formed of synthetic resin or metal, and has high rigidity (in other words, strength) for the purpose of protecting the high voltage electric wires 61 which are arranged under the floor 52 of the hybrid car 51 from splashing stones. In case where the protection member 60 is formed of synthetic resin, an outside of the high voltage electric wires 61 is covered with an electromagnetic shielding member which is not shown, inside the protection member 60. The clamp 59 for fixing the wire harness 58 to the vehicle body is provided at an outer circumferential side of the protection member 60, and includes a part for holding the protection member 60, and a part to be fixed to the vehicle body by screwing.

Moreover, in Patent Document 2, it is described, although not shown, that two thick pieces of high voltage electric wires are arranged from an inverter continued from a motor at a front side of a vehicle to a battery (in other words, a battery pack) at a rear side of the vehicle. In Patent Document 2, each of the high voltage electric wires has a core conductor formed of copper or aluminum, and an insulating covering for covering the core conductor. Moreover, a tubular metallic foil member having an elliptical shape in cross section for electromagnetic shielding is provided outside the two high voltage electric wires, and an outside of the tubular metallic foil member is covered with a wire protection member having an elliptical shape in cross section, and further, an outside of the wire protection member is covered with a pipe member (in other words, a wire protection tube) having an elliptic shape in cross section which is formed of metal or synthetic resin. The wire harness in Patent Document 2 has such a structure as described above. A part of the wire harness is arranged under the floor of the vehicle body. The pipe member having the elliptical shape in cross section is fixed to the vehicle body by means of a bracket having a plate-like shape (that is, a clamp) by screwing.

PRIOR ART DOCUMENT

Patent Document

Patent Document 1: JP-A-2011-72079 (FIGS. 1 and 2)
Patent Document 2: JP-A-2011-193677 (FIG. 1)

SUMMARY OF THE INVENTION

Problems that the Invention is to Solve

However, in the conventional structure for fixing the harness protection tube, in a state where the harness having the electric wires and insulating covering is passed through the harness protection tube, and the harness protection tube is fixed to the vehicle body or the like by means of the clamp, there is such possibility that the harness flutters (that is, swings) inside the harness protection tube with vibration while the vehicle is running, vibration of an engine while the vehicle is stopping, and so on. When the harness flutters, strange noises may occur, or abrasion of the insulating covering of the harness may occur.

The invention has been made in view of the above described problem, and it is an object of the invention to provide a clamp structure of a harness protection tube capable of preventing the harness from fluttering inside the harness protection tube through which the harness is passed, in a state where the harness protection tube is fixed to a mounting side by means of a clamp.

Means for Solving the Problems

In order to solve the above described problem, the clamp structure of the harness protection tube according to the invention has such characteristics as described below in (1) to (3).

(1) A clamp structure of a harness protection tube including a harness protection tube through which a harness is passed, and a clamp for securing which is provided at an outer circumferential side of the harness protection tube, wherein:
  the clamp has a base part which supports the harness protection tube, and a tube holding band part which is formed so as to protrude from the base part,
  the tube holding band part has a harness pressing part; and
  the harness pressing part which is inserted into the harness protection tube from a hole part formed in a peripheral wall of the harness protection tube comes into pressure contact with the harness to depress fluttering of the harness.

According to the structure as described above in (1), the harness pressing part of the clamp is inserted into the hole part in the peripheral wall of the harness protection tube and presses the harness inside the harness protection tube. In this state, the wire harness having the harness protection tube and the harness is fixed to the vehicle body or the like (that is, the mounting side) by means of the clamp. Accordingly, even though the harness flutters (that is, significantly swings) inside the harness protection tube, with vibration or so while the vehicle is running, fluttering of the harness is prevented, because the harness pressing part of the clamp presses the harness against an inner face of the peripheral wall of the harness protection tube.

(2) The clamp structure of a harness protection tube according to the above item (1), wherein the harness pressing part has a lock part which is adapted to be locked to the hole part.

According to the structure as described above in (2), at the same time when the harness pressing part is inserted into the hole part of the peripheral wall of the harness protection tube and presses the harness, the lock part which is provided on the harness pressing part is locked to an inner edge of the hole part thereby to reliably maintain the harness in a state pressed with the harness pressing part. It is preferable that the tube holding band part of the clamp is elastically closed thereby to hold the harness protection tube. Alternatively, it is preferable that the tube holding band part is fixed to the base part of the clamp with other lock unit which is different from the lock part.

(3) The clamp structure of a harness protection tube as described above in (1), wherein the tube holding band part has a lock part, and the base part has a retaining part to which the lock part is adapted to be retained.

According to the structure as described above in (3), the harness pressing part provided on the tube holding band part of the clamp is inserted into the harness protection tube from the hole part in the peripheral wall of the harness protection tube, and presses the harness. At the same time, the lock part which is provided on the tube bolding band part separately from the harness pressing part is engaged with the retaining part of the base part of the clamp (in other words, locked to), and the tube holding band part is locked in a state where the harness is pressed with the harness pressing part, thereby to firmly hold the harness protection tube.

According to the structure as described above in (1), in a state where the harness protection tube through which the harness is passed is fixed to the mounting side such as the vehicle body by means of the clamp, the harness pressing part presses the harness inside the harness protection tube thereby to prevent fluttering of the harness. In this manner, it is possible to prevent occurrence of strange noises or abrasion of the harness while the vehicle is running thereby to enhance quality of the vehicle. Moreover, because fluttering of the harness inside the harness protection tube is prevented by means of the clamp for securing the wire harness, necessity of other components for preventing fluttering of the harness is eliminated, and therefore, it is possible to simplify the structure of the wire harness and to achieve reduction of cost.

According to the structure as described above in (2), while the harness inside the harness protection tube is pressed with the harness pressing part of the clamp, the harness pressing part is locked so as not to escape from the hole part by means of the lock part which is provided on the harness pressing part. In this manner, the harness is reliably pressed with the harness pressing part, and therefore, fluttering of the harness can be reliably prevented. Moreover, because the harness pressing part and the lock part are integrally provided, it is possible to simplify the clamp structure and to achieve reduction of the cost.

According to the structure as described above in (3), the harness inside the harness protection tube is pressed with the harness pressing part which is provided on the tube holding band part of the clamp thereby to prevent fluttering of the harness inside the harness protection tube. At the same time, the tube holding band part is locked to the base part by means of the lock part which is provided separately from the harness pressing part. Therefore, it is possible to reliably allow the tube holding band part to hold and fix the harness protection tube.

MODE FOR CARRYING OUT OF THE INVENTION

Figure 1:
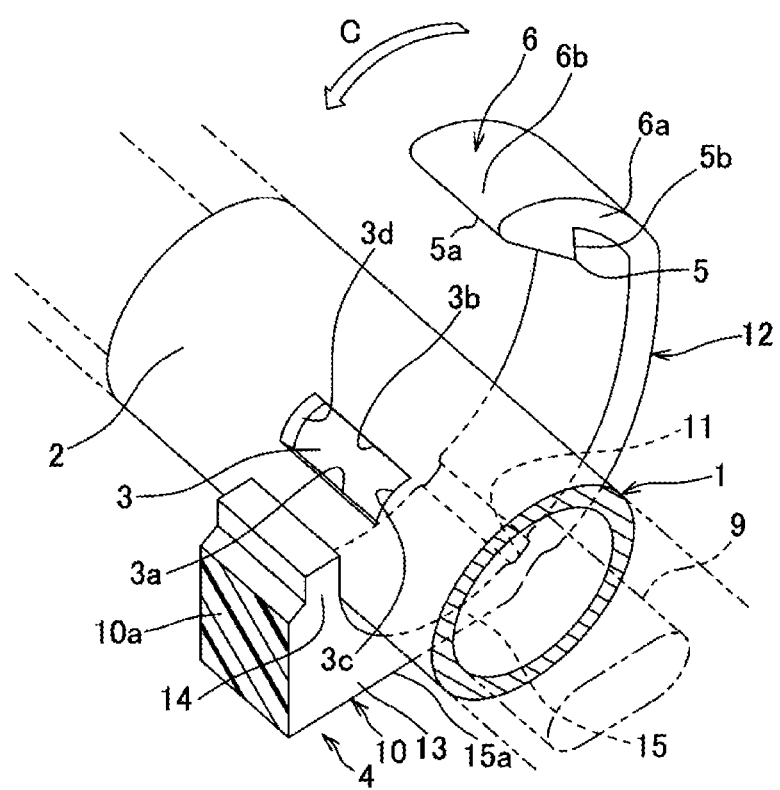
FIG. 1 is a perspective view showing a clamp structure of a harness protection tube in a first embodiment in a state before the tube is fixed.
Figure 2:
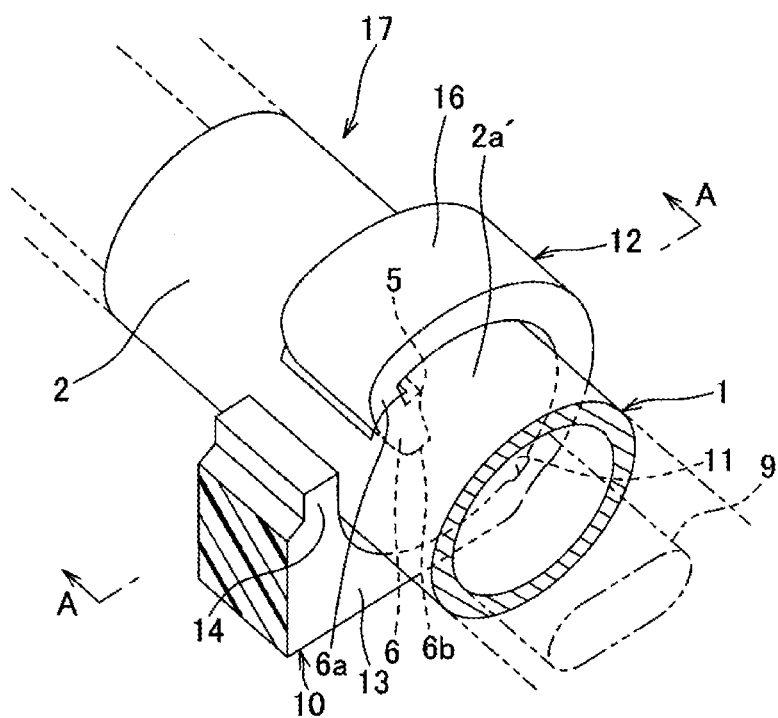
FIG. 2 is a perspective view showing the clamp structure of the harness protection tube in FIG. 1, in a state after the tube has been fixed.
Figure 3:
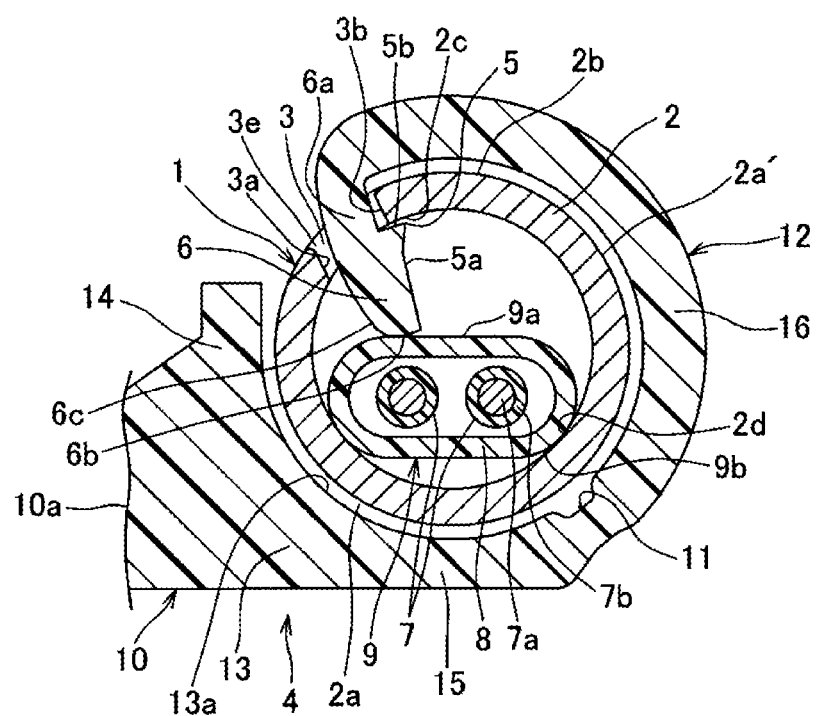
FIG. 3 is a sectional view taken along a line A-A in FIG. 2.

FIGS. 1 to 3 show the clamp structure of the harness protection tube in the first embodiment according to the invention.

As shown in FIGS. 1 and 2, a harness protection tube 1 in this embodiment is formed in a tubular shape having a round shape in cross section, using synthetic resin or metal as material. The harness protection tube 1 has a hole part 3 in a rectangular shape (in other words, a slit-like shape) which is so formed as to pass through a part of a peripheral wall 2 thereof. The hole part 3 is used for allowing a harness pressing part 6 which serves also as a locking hook (that is, a lock part) of a clamp 4 formed of synthetic resin to be inserted and locked thereto. Polypropylene or the like can be used as the synthetic resin material for the harness protection tube 1, and aluminum, stainless steel or the like can be used for the metal material, for example.

Figure 6:
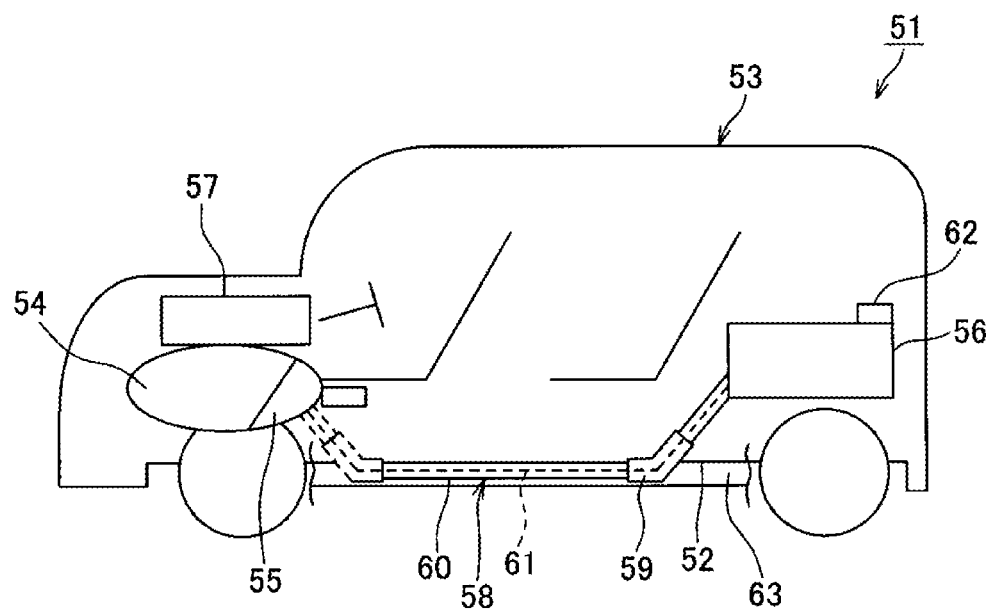
FIG. 6 is an explanatory view showing an example of a conventional harness protection tube in a state of use.

The harness protection tube 1 is arranged in a state exposed under the floor 52 of the hybrid car 51, for example, as shown in FIG. 6 of the conventional case. The harness protection tube 1 is extended long in a longitudinal direction of the vehicle, and arranged inside the vehicle body 53. The harness protection tube 1 is fixed to the vehicle body 53 or the like (that is, a mounting part) by means of a plurality of the clamps 4 (See FIG. 1), in a state bent so as to be directed toward the inverter 55 adjacent to the motor 54 in the front part of the vehicle body, and toward the high voltage battery 56 in the rear part of the vehicle body.

As compared with the harness protection tube 1 formed of metal material, the harness protection tube 1 formed of synthetic resin has a thickness (that is, a wall thickness) to some extent (specifically, such an extent that the tube is not easily bent), for the purpose of increasing its rigidity (that is, strength). As shown in FIG. 1, the hole part 3 which is provided in the peripheral wall 2 of the harness protection tube 1 has longer sides 3a, 3b at right and left sides in a longitudinal direction of the tube, and shorter sides 3c, 3d at front and rear sides in a circumferential direction of the tube.

It is also possible to fix the harness protection tube 1 (See FIG. 1) to a vehicle body of an automobile which is driven only by an engine 57 (See FIG. 6) or a vehicle body of an electric car, besides the hybrid car 51, by means of the clamps 4. In case of the automobile which is driven only by the engine, the harness protection tube 1 is not always exposed under the floor 52 (See FIG. 6). In this case, the harness protection tube 1 can be formed having lower strength and smaller wall thickness, as compared with the tube for the hybrid car and the electric car. Moreover, in this case, the electric wire to be passed through the harness protection tube 1 is only the low voltage electric wire.

In this embodiment, description will be made referring to a case where high voltage electric wires 7 (See FIG. 3) connected to the high voltage battery 56 (See FIG. 6) are passed through the harness protection tube 1, as an example to be applied to the hybrid car 51 (See FIG. 6). Because the harness protection tube 1 (See FIG. 1) is not provided with a harness inserting slit in the longitudinal direction of the tube, the high voltage electric wires 7 (See FIG. 3) are inserted from an opening at one side and passed to the opening at the other side, out of the openings (not shown) at both ends in the longitudinal direction of the harness protection tube 1. A terminal (not shown) is connected to ends of the high voltage electric wires 7, and the relevant terminal is inserted into a connector housing (not shown), for example.

As shown in FIG. 3 (FIG. 3 is a sectional view taken along a line A-A in FIG. 2), in this embodiment, the two high voltage electric wires 7 of a positive terminal and a negative terminal, each having a core conductor 7a covered with an insulating covering 7b, are arranged in parallel in a horizontal direction. An outside of the two high voltage electric wires 7 is covered with an insulating covering 8 having an elliptical shape in cross section. In case where the harness protection tube 1 is not formed of conductive metal but formed of synthetic resin, it is preferable that a shielding member such as a conductive shield braid or a shield foil (not shown) having an elliptical shape in cross section may be provided inside the insulating covering 8 so as to cover the two high voltage electric wires 7.

In the clamp structure of the harness protection tube in this embodiment, the harness protection tube 1 is formed in a round shape in cross section. On the other hand, a harness 9 which has at least the two high voltage electric wires 7 and the insulating covering 8 having the elliptical shape in cross section is formed in an elliptical shape in cross section whose longer diameter is smaller than an inner diameter of the harness protection tube 1. For this reason, the harness 9 is likely to flutter (that is, swing with a large amplitude) in a vertical direction inside the harness protection tube 1 (that is, in a direction of a shorter diameter of the harness 9).

In order to prevent occurrence of this fluttering, in the clamp structure of the harness protection tube in this embodiment, the harness pressing part 6 is inserted into the hole part 3 having a rectangular shape (that is, a slit-like shape) in the harness protection tube 1. The harness pressing part 6 integrally has the locking hook 5 of the clamp 4, and locked to the hole part 3. Because the harness pressing part 6 presses an outer face 9a at a shorter diameter side of the harness 9 inside the harness protection tube 1 (specifically, because the harness pressing part 6 comes into contact with the outer face 9a at the shorter diameter side of the harness 9), the fluttering of the harness 9 in the vertical direction (that is, in the direction of the shorter diameter) inside the harness protection tube 1 is prevented.

As shown in FIG. 1, the clamp 4 includes a base part 10, a tube holding band part 12 in a shape of a curved band which is integrally formed so as to project from the base part 10 via a hinge part 11 having a slightly smaller wall thickness than the base part 10, and the harness pressing part 6 which is integrally formed so as to extend from a projected distal end of the tube holding band part 12, and serves also as the locking hook 5.

The base part 10 includes a tube supporting wall 13 having an inner face 13a in a circular shape in cross section (See FIG. 3) which comes into contact with an outer peripheral face 2a (See FIG. 3) of the peripheral wall 2 of the harness protection tube 1, at one side, and a bracket part (not shown) having a bolt inserting hole (not shown) or a clip inserting hole (not shown) to be fixed to the mounting side of the vehicle body or the like (not shown), at the other side (that is, at a left side of a part 10a which is partly cut away, in FIG. 1). The tube supporting wall 13 includes a side wall part 14 protruding upward at the left side of the harness protection tube 1 in FIG. 1, higher than a radius of the harness protection tube 1, and a bottom wall part 15 extending along a bottom face (that is a mounting outer face) 15a of the base part 10 which is adapted to come into contact with the mounting side of the vehicle body or the like. The tube holding band part 12 in a shape of a curved belt is integrally continued from a distal end of the bottom wall part 15 via the hinge part 11.

The tube holding band part 12 preferably has an elasticity in a closing direction (that is, a direction of an arrow mark C in FIG. 1), specifically, a direction of holding (in other words, clamping) the harness protection tube 1 between the tube holding band part 12 and the side wall part 14. In case of such a structure, in a state where the tube holding band part 12 is flexed outward around the hinge part 11 against the elasticity (in other words, an urging force), as shown in FIG. 1, for example, it is possible to insert the harness protection tube 1 from above toward the inner face 13a in a circular shape of the base part 10. It is to be noted that the hinge part 11 may be omitted, provided that the harness protection tube 1 can be inserted by flexing the tube holding band part 12 outward against the inward urging force of the tube holding band part 12. In this specification, a side of the bottom face 15a of the base part 10 is described as a lower side. Actually, the clamp 4 is mounted to an outside face of the vehicle under the floor 52 (See FIG. 6) of the vehicle body 53 (See FIG. 6), for example, in a vertically inverted manner, in some cases.

The tube holding band part 12 has a curved part 16 which is curved inwardly from a distal end of the side wall part 14 (the right end in FIG. 3) of the tube supporting wall 13, that is, from the hinge part 11, along the outer peripheral face 2a' of the harness protection tube 1 by a circumferential length of a half or more of the circumference of the harness protection tube 1. Moreover, the tube holding band part 12 has the harness pressing part 6 which is bent inwardly in a radial direction of the harness protection tube 1 (that is, downwardly) from the projecting distal end of the curved part 16, and the locking hook 5 which is integrally formed with the harness pressing part 6.

In a state where the harness pressing part 6 is engaged with the hole part 3 in the harness protection tube 1, the harness pressing part 6 is positioned leftward than a top (that is, an upper end) 2b of the harness protection tube 1 (specifically, close to the side wall part 14 of the tube supporting wall 13 of the clamp 4). Moreover, in this state, the harness pressing part 6 is bent inwardly from the tube holding band part 12 at an intersecting angle of about 90°, and protrudes into the harness protection tube 1 through the hole part 3 of the harness protection tube 1 which is similarly formed close to the side wall part 14. Then, the harness pressing part 6 presses the harness 9 which includes the two high voltage electric wires 7 and at least the insulating covering 8, toward the bottom wall part 15 of the tube supporting wall 13 (that is, downwardly).

As shown in FIGS. 1 and 3, the harness pressing part 6 has a projecting part 6a having substantially the same wall thickness as the tube holding band part 12, and the locking hook 5 which is integrally formed on an inner face of the projecting part 6a in a projecting manner. A distal end of the projecting part 6a, that is, a distal end of the harness pressing part 6 is not pointed, but formed with a curved face 6b. The harness pressing part 6 firmly presses the harness 9 downward with the curved face 6b having a relatively large area.

The locking hook 5 has an inclined face 5a which is gradually increased in thickness from the thickness of the projecting part 6a, as going upward in FIG. 3 (specifically, as going toward the hole part 3 of the harness protection tube 1), and a locking face 5b which intersects an upper end of the inclined face 5a to project substantially perpendicularly to an inner face of the projecting part 6a. It is so set that a sum of a width of the locking face 5b of the locking hook 5 and a wall thickness of the projecting part 6a on a same plane as the locking face 5b is slightly larger than an inner width between the longer sides 3a, 3b of the hole part 3 of the harness protection tube 1. The locking hook 5 is inserted into the hole part 3 of the harness protection tube 1 in a press-fitting manner together with the harness pressing part 6, and passed through the hole part 3 while slightly flexed and deformed inwardly. Then, after the locking hook 5 has been passed through the hole part 3, the locking hook 5 is elastically restored outward and engaged with an inner edge 2c of the hole part 3 (that is, an inner face of the harness protection tube 1) so as not to escape (in other words, retained). It is also possible to provide a slit (not shown) between the locking hook 5 and the projecting part 6a so that the locking hook 5 may be elastically deformed in an arm-like shape.

As shown in FIG. 3, while the tube holding band part 12 of the clamp 4 elastically holds the harness protection tube 1 in a radial direction toward the tube supporting wall 13, the harness pressing part 6 at the distal end side of the tube holding band part 12 presses the harness 9 downwardly toward the bottom wall part 15 of the tube supporting wall 13. As the results, outer faces 9b at a lower side of the insulating covering 8 surrounding the harness 9 at both right and left sides are pressed against an inner face 2d at a lower side of the harness protection tube 1 thereby to prevent the harness 9 from fluttering in the vertical direction and in the lateral direction.

When the tube holding band part 12 is elastically closed around the hinge part 11 in the tube holding direction (that is, the direction of the arrow mark C in FIG. 1), the harness pressing part 6 is automatically positioned in the hole part 3 of the harness protection tube 1 along an excursion of the tube holding band part 12 in the closing direction (Specifically, so positioned that the curved face (a projecting end) 6b of the harness pressing part 6 is opposed to an opening 3e of the hole part 3). In this state, an operator presses an outer face of the tube holding band part 12 at a side of a base end (that is, a root) of the harness pressing part 6 downward with hand. Then, the locking hook 5 is press-fitted into the hole part 3, and smoothly engaged with an inner edge 2c of the hole part 3 (that is, the inner face of the harness protection tube 1) with favorable workability.

In this embodiment, the harness pressing part 6 is so formed as to be curved slightly outwardly along the excursion of the tube holding band part 12 in the closing direction (that is, the direction of the arrow mark C in FIG. 1). Moreover, the longer side 3a at a left end of the hole part 3 is inclined while offsetting outward with respect to a phantom line directed to a center of the harness protection tube 1, so that an outer face (that is, a left face in FIG. 3) 6c of the distal end of the harness pressing part 6 may be smoothly guided by sliding (Specifically, the longer side (the left end face) 3a and the longer side (the right end face) 3b of the hole part 3 are not parallel to each other).

In this embodiment, the harness pressing part 6 presses the outer face 9a in a left half part of the harness 9 having an elliptical shape in cross section. In case where the harness pressing part 6 is so formed as to project longer than its length in FIG. 3, and an intersecting angle between the curved part (a main body of the tube holding band part) 16 and the projecting part 6a of the harness pressing part 6 is set to be more acute than the intersecting angle in FIG. 3, it is possible to press the outer face 9a of the harness 9 in a center part thereof in a lateral direction with the curved face (the projecting end) 6b of the harness pressing part 6.

In case where a wire harness 17 including the harness protection tube 1 and the harness 9 is so arranged as to be exposed under the floor of the automobile, it is possible to let the hole part 3 serve as a water escape hole of the harness protection tube 1, by arranging the hole part 3 of the harness protection tube 1 in a manner directed downward to the ground. Moreover, for the purpose of preventing intrusion of water into the tube 1 from a gap between the harness pressing part 6 of the clamp 4 and the hole part 3, it would be preferable to fill the gap of the hole part 3 with sealing agent or the like. In case where the harness protection tube 1 is arranged inside the vehicle body of the automobile, necessity of waterproofing the gap of the hole part 3 is not so high.

In the first embodiment as described above referring to FIGS. 1 to 3, it has been described that it is preferable to elastically urge the tube holding band part 12 in the closing direction (that is, in the direction of the arrow mark C in FIG. 1) and to hold the harness protection tube 1 with this urging force. On the other hand, in case where another lock part (a locking piece 23 as a locking unit) which is different from the locking hook 5 is provided on the tube holding band part 12, as shown in a second embodiment described below referring to FIGS. 4 to 5, there is no necessity of applying an elastic force in the closing direction to the tube holding band part 12.

Figure 4:
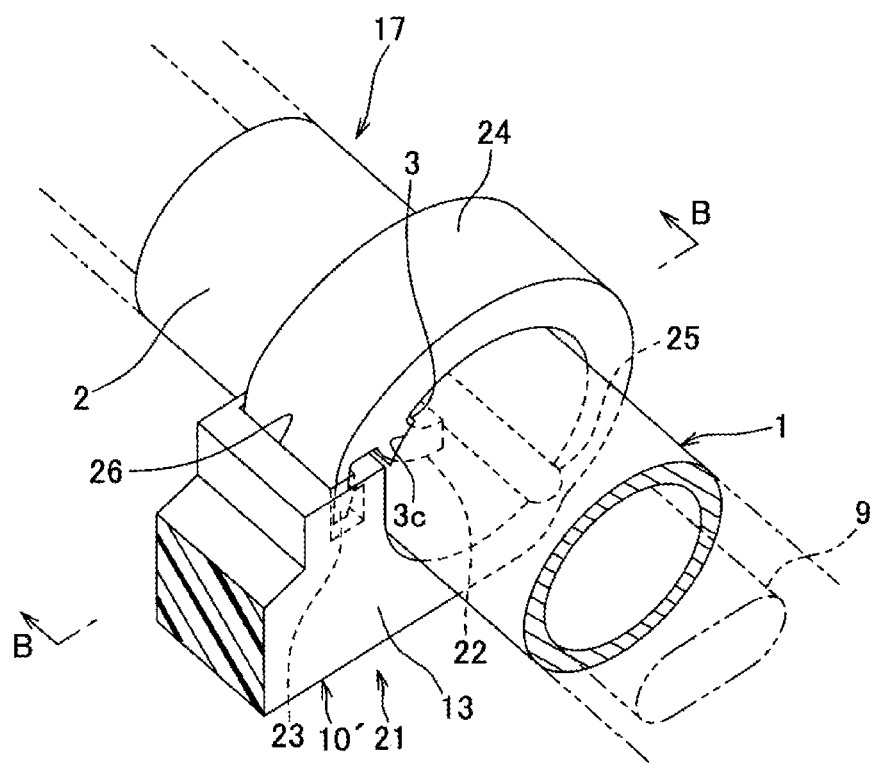
FIG. 4 is a perspective view showing a clamp structure of a harness protection tube in a second embodiment in a state after the tube has been fixed.
Figure 5:
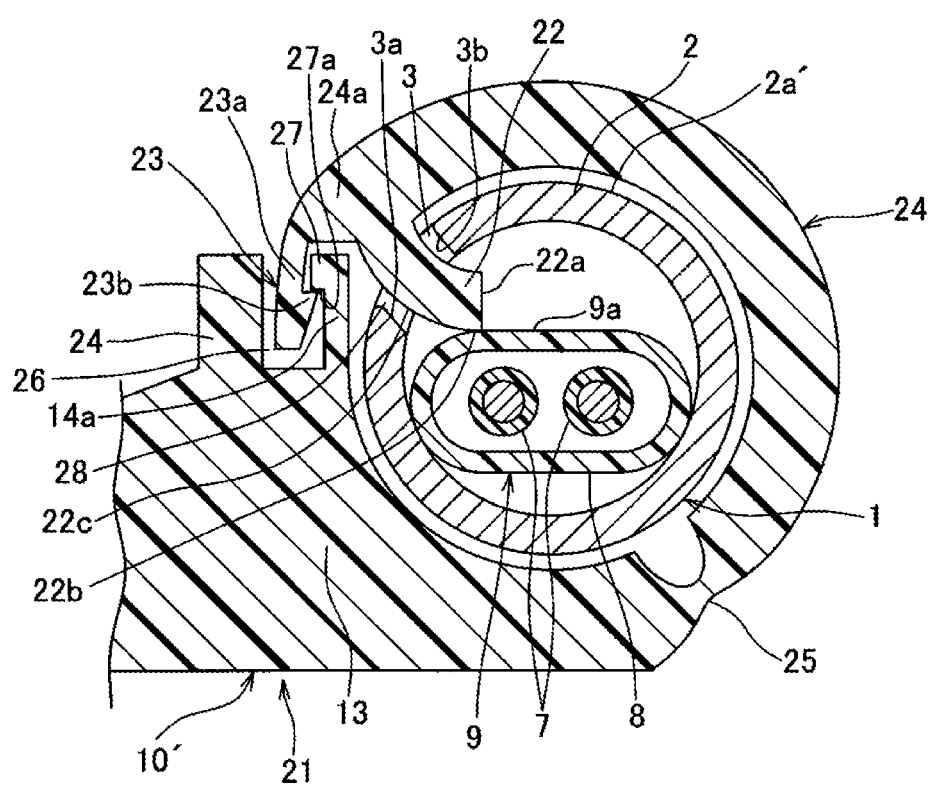
FIG. 5 is a sectional view taken along a line B-B in FIG. 4.

FIGS. 4 and 5 show the second embodiment of the clamp structure of the harness protection tube according to the invention. The same constituent parts as in the first embodiment in FIGS. 1 to 3 are denoted with the same reference numerals, and detailed description of the same will be omitted.

In this clamp structure of the harness protection tube 1, a harness pressing part 22 of a clamp 21 is modified in shape, as compared with the structure in the first embodiment in FIGS. 1 to 3. Specifically, the harness pressing part 22 and the locking piece 23 are formed separately, and the locking piece 23 is locked to a base part 10' of the clamp 21, but not to the hole part 3 of the harness protection tube 1. Accordingly, a tube holding band part 24 need not be provided with an inward elastic force, and thus, a further thin wall thickness is realized in a hinge part 25 interconnecting the tube supporting wall 13 of the base part 10' and the tube holding band part 24.

The harness protection tube 1 is the same as the harness protection tube in the first embodiment, and has the hole part 3 in a shape of a rectangular slit having the right and left longer sides 3a, 3b in the longitudinal direction of the tube, and the front and rear shorter sides 3c, 3d in the circumferential direction of the tube. The wire harness 17 includes the harness protection tube 1, and the harness 9 having the two high voltage electric wires 7 and at least the insulating covering 8 surrounding the wires.

The harness pressing part 22 and the locking piece 23 are arranged sequentially in parallel with each other at a projecting end side of the tube holding band part 24 in a circular shape (in other words, a curved shape) of the clamp 21. The harness pressing part 22 is projected from an inner face of the tube holding band part 24 at a distal end side inwardly in a radial direction of the harness protection tube 1, and curved in a circular shape in an opposite direction to the curved shape of the tube holding band part 24. A distal end face 22a of the harness pressing part 22 is directed to an intermediate part in the longitudinal direction of the tube holding band part 24. The harness pressing part 22 may be provided with flexibility (in other words, elasticity) in a direction of its wall thickness (that is, in a vertical direction in FIG. 5).

When the tube holding band part 24 is closed around the hinge part 25 toward the outer peripheral face 2a' of the harness protection tube 1, the harness pressing part 22 is automatically inserted into the hole part 3 of the harness protection tube 1 along an excursion of the tube holding band part 24 in the closing direction. Then, a distal end part 22b of a curved outer face of the harness pressing part 22 which has been inserted into the hole part 3 comes into pressure contact with the outer face 9a of the harness 9 in a left half thereof. By setting a projecting length of the harness pressing part 22 longer than a projecting length in FIG. 5, it is also possible to press a center part of the harness 9 in the lateral direction thereof downwardly.

The locking piece (the lock part) 23 is integrally provided in a projecting manner, further outside the harness pressing part 22 (that is, a left side in FIG. 5), specifically, at a further distal end side of the tube holding band part 24. The locking piece 23 has a locking piece body 23a which is extended having a curved shape and a thin wall thickness, along the curved shape of the tube holding band part 24, and a hook part (protrusion) 23b which is formed so as to protrude from an inner face of the locking piece body 23a at a projecting distal end side thereof.

The side wall part 14 which is upwardly projected at a left end side of the tube supporting wall 13 of the base part 10' of the clamp 21 is provided with a bottomed hole (a recess) 26 in a rectangular shape for allowing the locking piece to be inserted. Moreover, a locking step or a retaining protrusion (that is, a retaining part) 27 having a downwardly directed horizontal locking face 27a to which the hook part 23b of the locking piece 23 is to be locked is formed on an upper edge (an opening end edge) of a right wall 14a of the bottomed hole 26 in the side wall part 14.

In a state where the distal end part 22b of the harness pressing part 22 at the distal end side of the tube holding band part 24 presses the harness 9 having the two high voltage electric wires 7 and at least the insulating covering 8 downward, the locking piece 23 positioned at the further distal end side of the tube holding band part 24 is locked to the retaining protrusion 27 of the clamp 21. In this manner, the harness 9 is favorably kept pressed with the harness pressing part 22 (that is, fluttering is prevented).

In the clamp structure of the harness protection tube in the second embodiment, the harness pressing part 22 and the locking piece 23 are separated from each other. For this reason, it is also possible to provide the harness pressing part 22 more remote from the hinge part 25 than in the embodiment as shown in FIG. 5, to be positioned in an intermediate part in the longitudinal direction of the tube holding band part 24 or at the base end side of the tube holding band part 24 (that is, close to the hinge part 25). In this case, the hole part 3 of the harness protection tube 1 should be provided on a top (that is, an upper end) of the harness protection tube 1 or more close to the top than in the case as shown in FIG. 5, alternatively, at a symmetrical position to the position in FIG. 5 (that is, at the right side).

In the second embodiment as shown in FIG. 5, a wall part 24a at a distal end side of the tube holding band part 24 extending from the harness pressing part 22 to the locking piece 23 covers a gap 28 between the longer side (the left end face) 3a of the hole part 3 and a curved left face 22c of the harness pressing part 22. Therefore, intrusion of water or dust into the hole part 3 from the exterior is reduced, as compared with the first embodiment as shown in FIGS. 1 to 3. It is to be noted that for perfect waterproofing of the hole part 3, a sealing agent may be preferably used.

Although in the above described embodiments, the invention has been described referring to an example in which the two high voltage electric wires 7 are used, it is also possible to apply the securing structure, namely, the clamp structure using the clamps 4, 21, even to a case where the three high voltage electric wires 7 are arranged in parallel or so as to be positioned at respective apexes of a triangle. For example, in case where the inverter 55 (See FIG. 6) is provided in the front part of the vehicle, and the motor 54 (FIG. 6) is provided in the rear part of the vehicle, the three high voltage electric wires 7 are arranged from the front part to the rear part of the vehicle. The above described clamp structure can be also applied to a case where not only the high voltage electric wires 7 but also the low voltage electric wire are arranged together, or the case where the harness 9 is formed by covering the high voltage electric wires 7 with the shielding member such as the shield braid or shield foil having an elliptical shape in cross section, and by further covering the shielding member with the insulating covering (in other words, a sheath) 8.

Moreover, in the above described embodiments, the harness protection tube 1 having a round shape in cross section is used. However, in case where the harness protection tube 1 having an elliptical shape in cross section is used, for example, it is also possible to apply the above described clamp structure, for the purpose of preventing fluttering of the harness 9, that is, the high voltage electric wires 7 due to the gap between the outer face of the harness 9 and the inner face of the harness protection tube 1.

Moreover, it is also possible to apply the clamp structure even to a case where the harness 9 is not formed in an elliptical shape in cross section but formed in a round shape in cross section, and the harness 9 having a round shape in cross section is passed through the harness protection tube 1 having a round shape in cross section. Moreover, in case where the harness 9 having a round shape in cross section is passed through the harness protection tube 1 having an elliptical shape in cross section, it is possible to apply the harness pressing part 6, 22 of the clamp structure at a longer diameter side of the harness protection tube 1 having an elliptical shape in cross section.

Moreover, in the above described embodiments, the tube holding band part 12, 24 is fixed to the harness protection tube 1 or the clamp 4, 21 by means of the locking hook (the lock part) 5, 23. However, it is also possible to omit the locking hook 5, 23, provided that a larger elasticity is set in the closing direction (that is, the tube holding direction) of the tube holding band part 12, 24. In this case, such a structure that the hinge part 11, 25 is not provided at the root side may be adopted.

It is to be noted that a technical scope of the invention is not limited to the above described embodiments. Various modifications and improvements can be added to the above described embodiments within the technical scope of the invention.

Summaries of the clamp structure of the harness protection tube according to the embodiments will be described below.

(1) The clamp structure of the harness protection tube according to the embodiments includes the harness protection tube 1 through which the harness 9 is passed, and the clamp 4 (21) for securing which is arranged at the outer circumferential side of the harness protection tube 1. The clamp 4 (21) has the base part 10 (10') for supporting the harness protection tube 1, and the tube holding band part 12 (24) which is formed so as to protrude from the base part 10 (10'). The tube holding band part 12 (24) has the harness pressing part 6 (22). Then, the harness pressing part 6 (22) which is inserted into the harness protection tube 1 from the hole part 3 formed in the peripheral wall 2 of the harness protection tube 1 comes into pressure contact with the harness 9 thereby to depress fluttering of the harness 9.

(2) In the clamp structure of the harness protection tube according to the first embodiment, the harness pressing part 6 has the locking hook (the lock part) 5 to be locked to the hole part 3.

(3) In the clamp structure of the harness protection tube according to the second embodiment, the tube holding band part 24 has the locking piece (the lock part) 23, and the base part (10') has the retaining protrusion (the retaining part) 27 to which the locking piece 23 is retained.

This invention is based on Japanese Patent Application (Application No. 2012-192881) filed on Sep. 3, 2012, the contents of which are hereby incorporated by reference.

INDUSTRIAL APPLICABILITY

The clamp structure of the harness protection tube according to the invention can be used for the purpose of preventing the harness from fluttering inside the harness protection tube, in a state where the harness protection tube through which the harness is passed is fixed to the mounting side by means of the clamp.

DESCRIPTION OF THE REFERENCE NUMERALS AND SIGNS

1 Harness protection tube
2 Peripheral wall
3 Hole part
4, 21 Clamp
5 Locking hook (lock part)
6, 22 Harness pressing part
9 Harness
10, 10' Base part
12, 24 Tube holding band part
23 Locking piece (lock part)
27 Retaining protrusion (retaining part)

The invention claimed is:

1. A clamping system comprising:
a harness protection tube through which a harness is passed; and
a clamp for securing which is provided at an outer circumferential side of the harness protection tube, wherein:
the clamp has a base part which supports the harness protection tube, and a tube holding band part which is formed so as to protrude from the base part, the tube holding band part has a proximal end connected to the base part and a distal end opposite thereto;
the distal end terminating in a harness pressing part; and
the harness pressing part is inserted into the harness protection tube through a hole part formed in a peripheral wall of the harness protection tube and comes into pressure contact with the harness to depress fluttering of the harness.

2. The clamping system, according to claim 1, wherein the harness pressing part has a lock part to lock the tube holding band part to the harness protection tube by entering into the hole part.

3. The clamping system, according to claim 1, wherein:
the distal end also has a lock part; and
the base part has a retaining part to which the lock part is adapted to be retained.

* * * * *